(12) United States Patent
Sugata et al.

(10) Patent No.: US 12,193,444 B2
(45) Date of Patent: Jan. 14, 2025

(54) INSECTICIDAL COMPOSITION AND USE THEREOF

(71) Applicant: ADAMA MAKHTESHIM LTD., Beer Sheva (IL)

(72) Inventors: Roy Sugata, West Bengal (IN); Patil Bhagawan, Maharashtra (IN)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 438 days.

(21) Appl. No.: 16/976,203

(22) PCT Filed: Feb. 28, 2019

(86) PCT No.: PCT/IL2019/050229
§ 371 (c)(1),
(2) Date: Aug. 27, 2020

(87) PCT Pub. No.: WO2019/167049
PCT Pub. Date: Sep. 6, 2019

(65) Prior Publication Data
US 2021/0000120 A1 Jan. 7, 2021

(30) Foreign Application Priority Data

Feb. 28, 2018 (IN) .............................. 201831007625

(51) Int. Cl.
| | | |
|---|---|---|
| A01N 43/90 | (2006.01) | |
| A01N 25/10 | (2006.01) | |
| A01N 25/14 | (2006.01) | |
| A01N 25/22 | (2006.01) | |
| A01N 25/30 | (2006.01) | |
| A01N 43/26 | (2006.01) | |
| A01N 47/12 | (2006.01) | |
| A01P 7/04 | (2006.01) | |

(52) U.S. Cl.
CPC ............ *A01N 43/90* (2013.01); *A01N 25/10* (2013.01); *A01N 25/14* (2013.01); *A01N 25/22* (2013.01); *A01N 25/30* (2013.01); *A01N 43/26* (2013.01); *A01N 47/12* (2013.01); *A01P 7/04* (2021.08)

(58) Field of Classification Search
CPC ........ A01N 43/90; A01N 47/24; A01N 25/10; A01N 25/14; A01N 25/22; A01N 25/30; A01N 43/26; A01N 25/08; A01N 25/12; A01N 25/26; A01N 2300/00; A01N 47/12; A01P 7/04
See application file for complete search history.

(56) References Cited

U.S. PATENT DOCUMENTS

| | | | | |
|---|---|---|---|---|
| 6,210,625 | B1 * | 4/2001 | Matsushita | ........... C04B 38/009 |
| | | | | 426/514 |
| 6,662,491 | B2 * | 12/2003 | Flinn | ................... A01M 1/2055 |
| | | | | 43/132.1 |
| 8,221,776 | B1 * | 7/2012 | Sander | .................... A01N 57/28 |
| | | | | 424/405 |
| 8,802,130 | B2 * | 8/2014 | Pather | ................... A61K 9/0056 |
| | | | | 424/435 |
| 2020/0275649 | A1 * | 9/2020 | Levy | ......................... C05C 7/00 |

FOREIGN PATENT DOCUMENTS

| | | | | | |
|---|---|---|---|---|---|
| CN | 103081926 | A | * | 5/2013 | |
| CN | 104672029 | A | * | 6/2015 | |
| CN | 106659163 | A | * | 5/2017 | ............. A01N 25/14 |
| JP | 3077155 | B2 | * | 8/2000 | |

OTHER PUBLICATIONS

Sayed Roholla Mousavi, Mohammad Galavi and Maryam Rezaei, "Zinc (Zn) Importance for Crop Production—A Review", International journal of Agronomy and Plant Production. vol., 4 (1), 64-68, 2013. (Year: 2013).*
Jyothi Sri.S, A.Seethadevi, K.Suria Prabha, P.Muthuprasanna and P.Pavitra, "Microencapsulation: A Review", International Journal of Pharma and Bio Sciences, 2012, 3(1), 509-531. (Year: 2012).*
CN-103081926-A machine translation (Year: 2013).*
CN-106659163-A machine translation (Year: 2017).*
JP-3077155-B2 machine translation (Year: 2000).*
CN-104672029-A machine translation (Year: 2015).*

* cited by examiner

*Primary Examiner* — Mina Haghighatian
*Assistant Examiner* — Nathan W Schlientz
(74) *Attorney, Agent, or Firm* — Nath, Goldberg & Meyer; Joshua B. Goldberg

(57) ABSTRACT

The present invention provides a method for controlling the degradation of emamectin and cartap, the method comprising formulating a composition which comprises an amount of water less than 0.5% by weight based on the total weight of the stable composition and at least one pH adjuster for maintaining the pH at 25° C. after dilution in water at less than 5.5. The present invention further provides a stable solid insecticidal composition comprising: (1) an effective amount of emamectin; (2) an effective amount of cartap; and (3) at least one pH adjuster; wherein the composition is substantially free of water and the pH at 25° C. after dilution with water is less than 5.5.

31 Claims, 1 Drawing Sheet

Effect of pH and mositure content on degradation of Emamectin under acelerated storage (54 Deg C for 14 days) in Cartap + Ema GR formulation

■ % Emamectin degradation (14 Days Storage, 54°C) Process 2
■ % Emamectin degradation (14 Days Storage, 54°C) Process 1

INSECTICIDAL COMPOSITION AND USE THEREOF

This is a National Phase Application filed under 35 U.S.C. 371 as a national stage of PCT/IL2019/050229, filed Feb. 28, 2019, an application claiming the benefit of Indian Provisional Application No. 201831007625, filed Feb. 28, 2018, the content of each of which is hereby incorporated by reference in its entirety.

Throughout this application various publications are referenced. The disclosures of these documents in their entireties are hereby incorporated by reference into this application in order to more fully describe the state of the art to which this invention pertains.

TECHNICAL FIELD

The present invention relates to a stable insecticidal composition comprising combination of emamectin benzoate and cartap and the use thereof.

BACKGROUND

Insecticides are commonly used for controlling insect stress and are extremely important in order to achieve high crop efficiency.

Emamectin, (4"R)-5-O-demethyl-4"-deoxy-4"-(methylamino)avermectin was first reported by Merck & Co., Inc. Emamectin, a non-systemic insecticide, stimulates the release of γ-aminobutyric acid, an inhibitory neurotransmitter, thus finally activating chloride channels.

Cartap, S,S'-(2-dimethylaminotrimethylene) bis(thiocarbamate), was first reported by M. Sakai et al. Cartap, a systemic insecticide, is an analogue or propesticide of the natural toxin nereistoxin. Cartap is a nicotinergic acetylcholine blocker, causing paralysis by blocking cholinergic transmissions in the central nervous systems of insects.

Combining different active ingredients has the added value of increasing efficacy, preventing the emergence of resistant species and allows reduced application rates of individual active ingredients while concurrently maintaining an increased efficacy of the active ingredients. The combination of a non-systemic insecticide with systemic insecticide in a stable composition provides a solution which reduces resistance of the diseases, reduces application rates of the active ingredients, improves yield and reduces costs. In many cases, the combination of two insecticides provides a synergistic effect wherein the efficacy is increased.

However, there are often incompatibility issues when compositions comprising individual active ingredients are tank-mixed for application in the field.

Combining two active ingredients into one composition can be challenging due the variance in structure of the active ingredients, especially when one or both active ingredients are highly unstable and require different environment and composition conditions such as pH. Various pesticides are stable under acidic conditions, others are stable under basic or neutral conditions.

The pH value of water can negatively affect the stability of some pesticides and can effect formulating composition comprising multiple pesticides which are each sensitive and unstable in different pH environments. For example, in a composition comprising one pesticide that is stable in acidic conditions and a second pesticide that is stable in basic or neutral conditions, the less active ingredient will be available for application and the overall performance of the pesticide will be poor. The degradation of a pesticide can be measured in terms of its half-life. For example, if a product has a half-life of one hour, the amount of active ingredient is reduced to 50 percent in one hour, to 25 percent in the next hour, to 12.5 percent in the next hour, etc.

Emamectin is an insecticide which is sensitive in acidic conditions and stable in an alkali environment. Emamectin is highly unstable and decomposes rapidly (about 25%). Usually, a liquid composition comprising emamectin has a pH value of 5 to 8 and should not decrease to lower than 5. In the literature and available commercial products, emamectin benzoate is stable with pH value in range of 5-8. Preferably a pH value of 6. Therefore, in order to stabilize and reduce the decomposition of emamectin, the composition should have pH value between 5 to 8.

In contrast, cartap is an insecticide which is sensitive in alkali conditions and stable in acidic conditions. Compositions comprising cartap should have pH value of less than 5.

Chinese patent CN103081926 disclosed a synergistic mixture of emamectin and cartap and a wettable powder formulation containing emamectin benzoate and Cartap which, by weight, comprises of: sodium carbonate 1%, Cartap 20%, chitosan 0.8%, sodium dodecyl sulfate 1.5%, sodium lignosulfonate 5.5%, and it is made up to 100% with light calcium carbonate. The pH of the disclosed composition is 7 and the degradation of the emamectin is 24% and of the cartap is 7.15%

Chinese patent CN103891741 disclosed cartap compound formulation insecticide, which has the following composition by weight percentage: Cartap 50%, Fipronil 1%, emamectin benzoate 2%, dispersant 20%, and the rest is filler; said dispersant is Akzo Nobel D-400, D-425, D-450, NNO, sodium lignosulfonate or calcium lignosulfonate; said filler is silicon dioxide, silica, cellulosine, ammonium chloride or starch. The pH of the disclosed composition is 6.3 and the degradation of the emamectin is 54% and of the cartap is 11%.

Based on the above, there is a need in the art for a chemically stable solid composition comprising the combination of emamectin benzoate and cartap.

BRIEF DESCRIPTION OF THE DRAWINGS

FIG. 1 shows the upper line is composition prepared by process 2, the bottom line is composition prepared by process 1.

SUMMARY

The present invention provides a stable solid insecticidal composition comprising:
(1) an effective amount of emamectin;
(2) an effective amount of cartap; and
(3) at least one pH adjuster;
wherein the composition is substantially free of water and the pH at 25° C. after dilution with water is less than 5.5.

The present invention also provides a stable solid insecticidal composition comprising:
(1) an effective amount of emamectin;
(2) an effective amount of cartap; and
(3) at least one pH adjuster;
wherein the water content is less than 0.5% by weight based on the total weight of the stable composition and the pH at 25° C. after dilution in water is less than 5.5.

The present invention provides a stable solid insecticidal composition comprising:
  (a) an effective amount of emamectin benzoate;
  (b) an effective amount of cartap; and
  (c) at least one pH adjuster;
  wherein the composition is substantially free of water and the pH at 25° C. after dilution with water is less than 5.5.

The present invention also provides a stable solid insecticidal composition comprising:
  (a) an effective amount of emamectin benzoate;
  (b) an effective amount of cartap; and
  (c) at least one pH adjuster;
  wherein the water content is less than 0.5% by weight based on the total weight of the stable composition and the pH at 25° C. after dilution in water is less than 5.5.

The present invention provides a stable solid insecticidal composition comprising:
  (a) emamectin benzoate in an amount of 0.1-4% by weight based on the total weight of the stable composition;
  (b) cartap in an amount of 7-10% by weight based on the total weight of the stable composition; and
  (c) at least one pH adjuster;
  wherein the composition is substantially free of water and the pH at 25° C. after dilution with water is less than 5.5.

The present invention also provides a stable solid insecticidal composition comprising:
  (a) emamectin benzoate in an amount of 0.1-4% by weight based on the total weight of the stable composition;
  (b) cartap in an amount of 7-10% by weight based on the total weight of the stable composition; and
  (c) at least one pH adjuster;
  wherein the water content is less than 0.5% by weight based on the total weight of the stable composition and the pH at 25° C. after dilution in water is less than 5.5.

The present invention also provides a stable solid insecticidal composition comprising:
  (a) emamectin benzoate in an amount of about 0.25% by weight based on the total weight of the stable composition;
  (b) cartap in an amount of about 7.5% by weight based on the total weight of the stable composition; and
  (c) at least one pH adjuster;
  wherein the water content is less than 0.5% by weight based on the total weight of the stable composition and the pH at 25° C. after dilution in water is less than 5.5.

The present invention also provides a stable solid insecticidal composition comprising:
  (a) emamectin benzoate in an amount of about 0.25% by weight based on the total weight of the stable composition;
  (b) cartap in an amount of about 7.5% by weight based on the total weight of the stable composition; and
  (c) at least one pH adjuster;
  wherein the composition is substantially free of water and the pH at 25° C. after dilution with water is less than 5.5.

The present invention provides a stable solid insecticidal composition comprising:
  (a) emamectin benzoate in an amount of about 1% by weight based on the total weight of the stable composition;
  (b) cartap in an amount of about 25% by weight based on the total weight of the stable composition; and
  (c) at least one pH adjuster;
  wherein the composition is substantially free of water and the pH at 25° C. after dilution with water is less than 5.5.

The present invention further provides a method for controlling the degradation of emamectin and cartap, the method comprising formulating a composition which comprises a reduced amount of water and at least one pH adjuster for maintaining the pH at 25° C. after dilution in water at less than 5.5.

The present invention further provides a method for controlling the degradation of emamectin and cartap, the method comprising formulating a composition which comprises an amount of water less than 0.5% % by weight based on the total weight of the stable composition and at least one pH adjuster for maintaining the pH at 25° C. after dilution in water at less than 5.5.

The present invention further provides an improved stable solid composition comprising emamectin and cartap wherein the improvement comprises a reduced amount of water and presence of at least one pH adjuster for maintaining the pH of the composition after dilution in water at 25° C. at less than 5.5.

The present invention provides a method for increasing the chemical stability of composition comprising emamectin and cartap, the method comprising formulating a composition which comprises a reduced amount of water and at least one pH adjuster for maintaining the pH at 25° C. after dilution in water to less than 5.5.

The present invention also provides a method for controlling insects comprising applying the stable insecticidal solid composition described herein to a rice field or to an area or soil adjacent to an insect.

The present invention also provides a method for controlling insect comprising:
  (a) obtaining a stable insecticidal composition according to the present invention;
  (b) applying the stable insecticide composition to a crop, a portion of a crop, an area or soil adjacent to an insect, and/or a seed of a crop so as to thereby control the insect.

The present invention provides a process for preparing a stable solid insecticidal composition the process comprising the steps of:
  (a) preparing a premix of the emamectin, cartap, at least one pH adjuster and other agrochemicals acceptable inert additives;
  (b) milling the mixture to obtain powder;
  (c) activating the carrier with a binder;
  (d) coating the activated carrier of step (c) with the powder of (b) or spraying the powder (b) over the activated carrier of step (c); and
  Optionally, (e) drying the resulting mixture of step (d).

The present invention provides a process for preparing a stable solid insecticidal composition wherein the process comprises the steps of:
  (a) preparing a premix of the emamectin, cartap, at least one pH adjuster and other agrochemicals acceptable inert additives (b) activating the carrier with a binder;
  (c) coating the activated carrier of step (b) with the premix (a) or spraying the premix (a) over the activated carrier of step (b); and optionally (d) drying the resulting mixture of step (c).

The present invention further provides a process for preparing a stable solid insecticidal composition wherein the process comprises the steps of:
(a) preparing a powder blend of emamectin benzoate, a pH adjuster and other agrochemically acceptable inert additives;
(b) preparing a powder blend of cartap, a pH adjuster and other agrochemically acceptable inert additives;
(c) preparing a solution comprising a binder;
(d) multilayer coating of inert carrier with (a) and (b) using solution (c); and Optionally, (e) drying the resulting mixture of step (d).

DETAILED DESCRIPTION

Definitions

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter belongs.

As used herein, the term "effective" when used to describe a method for controlling of undesired insects means that the method provides a good level of control of the undesired insect without significantly interfering with the normal growth and development of the crop.

As used herein, the term "effective amount" refers to an amount of the mixture that, when ingested, contacted with or sensed, is sufficient to achieve a good level of control.

As used herein, the term "agriculturally acceptable carrier" means carriers which are known and accepted in the art for the formation of compositions for agricultural or horticultural use.

As used herein, the term "adjuvant" is broadly defined as any substance that itself is not an active ingredient but which enhances or is intended to enhance the effectiveness of the insecticide with which it is used. Adjuvants may be understood to include, spreading agents, penetrants, compatibility agents, and drift retardants.

As used herein, the term "agriculturally acceptable inert additives" is defined as any substance that itself is not an active ingredient but is added to the composition such as sticking agents, surfactants, synergists, anti-oxidation agent, defoaming agents and thickeners.

As used herein, the term "stable" when used in connection with a composition means that the amount of the decomposition of the active ingredients in the composition that is observable after at least 2 weeks of storage at a temperature of at least 54° C. is less than 5%.

As used herein, the term "dilution" refers, but is not limited to wetting the composition.

As used herein, the term "tank mix" means that two or more chemical pesticides or compositions are mixed in the spray tank at the time of spray application.

As used herein the term "crop" includes reference to whole plant, plant organ (e.g., leaves, stems, twigs, roots, trunks, limbs, shoots, fruits etc.), or plant cells.

As used herein the term "propagation material" is to be understood to denote all the generative parts of the plant such as seeds and spores, vegetative structures such as bulbs, corms, tubers, rhizomes, roots stems, basal shoots, stolons and buds.

As used herein, the term "locus" includes not only areas where weeds may already be growing, but also areas where weeds have yet to emerge, and also to areas under cultivation.

As used herein the term "ha" refers to hectare.

As used herein the term "substantially free of" refers to a concentration of less than 0.5%, preferably 0.2% by weight based on the total weight of the composition. An amount of water which does not affect the stability of the active ingredients.

As used herein, the term "mixture" or "combination" refers, but is not limited to, a combination in any physical form, e.g., blend, solution, alloy, or the like.

As used herein, the term "multi-layer coating" refers to the process of applying the active ingredients over the carrier surface. The process comprises at least two stages of a granule coating process using blends of the active ingredients.

The term "a" or "an" as used herein includes the singular and the plural, unless specifically stated otherwise. Therefore, the terms "a," "an" or "at least one" can be used interchangeably in this application.

Throughout the application, descriptions of various embodiments use the term "comprising"; however, it will be understood by one of skill in the art, that in some specific instances, an embodiment can alternatively be described using the language "consisting essentially of" or "consisting of."

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In this regard, use of the term "about" herein specifically includes ±10% from the indicated values in the range. In addition, the endpoints of all ranges directed to the same component or property herein are inclusive of the endpoints, are independently combinable, and include all intermediate points and ranges.

Stable Insecticidal Composition

Insecticide compositions for controlling insect stress in the vicinity of a rice crop are generally applied by (1) foliar application and/or (2) scattering granules i.e. throwing a solid insecticidal composition, directly into a paddy field filled with water or into a dry field which is then flooded with water.

The combination of emamectin and cartap in a single composition provides an efficient and simple controlling method.

For the use in the present invention, emamectin includes free base, salt, ester and combination thereof of two basic structures which are (1) (10E,14E,16E)-(1R,4S,5'S,6S,6'R,8R,12S,13S,20R,21R,24S)-6'-[(S)-sec-butyl]-21,24-dihydroxy-5',11,13,22-tetramethyl-2-oxo-3,7,19-trioxatetracyclo[15.6.1.1$^{4,8}$.0$^{20,24}$]pentacosa-10,14,16,22-tetraene-6-spiro-2'-(5',6'-dihydro-2'H-pyran)-12-yl 2,6-dideoxy-3-O-methyl-4-O-(2,4,6-trideoxy-3-O-methyl-4-methylamino-α-L-lyxo-hexopyranosyl)-α-L-arabino-hexopyranoside; and (2) (10E,14E,16E)-(1R,4S,5'S,6S,6'R,8R,12S,13S,20R,21R,24S)-21,24-dihydroxy-6'-isopropyl-5',11,13,22-tetramethyl-2-oxo-3,7,19-trioxatetracyclo[15.6.1.1$^{4,8}$.0$^{20,24}$]penta-cosa-10,14,16,22-tetraene-6-spiro-2'-(5',6'-dihydro-2'H-pyran)-12-yl 2,6-dideoxy-3-O-methyl-4-O-(2,4,6-trideoxy-3-O-methyl-4-methylamino-α-L-lyxo-hexopyranosyl)-α-L-arabino-hexopyranoside and combination thereof.

Emamectin refers to the free base, benzoate ester or combination thereof.

It has been found that in a solid composition comprising emamectin and cartap which is substantially free of water and wherein the pH value after dilution is equal to or less than 5.1, the level of decomposition of emamectin and cartap was reduced. It was found that the decomposition of the active ingredients was less than 5%.

Reducing the decomposition of the active ingredient is critical when the composition is a low load or an ultra-low load and the concentration of the sensitive active ingredient in the composition is less than 10%.

The insecticidal composition of the present invention which comprises emamectin and cartap, was found to be stable under various conditions and for various durations and the level of the decomposition of emamectin or/and cartap was reduced. The major advantage of this composition is its ability to combine two active ingredients with different physicochemical properties which are commonly formulated into separate compositions into a single composition.

The present invention provides a stable solid insecticidal composition comprising:

(a) an effective amount of emamectin;
(b) an effective amount of cartap; and
(c) at least one pH adjuster;
wherein the composition is substantially free of water and the pH at 25° C. after dilution with water is less than 5.5.

The present invention also provides a stable solid insecticidal composition comprising:

(a) an effective amount of emamectin;
(b) an effective amount of cartap; and
(c) at least one pH adjuster;
wherein the water content is less than 0.5% by weight based on the total weight of the stable composition and the pH at 25° C. after dilution in water is less than 5.5.

The present invention provides a stable solid insecticidal composition comprising:

(a) an effective amount of emamectin benzoate;
(b) an effective amount of cartap; and
(c) at least one pH adjuster;
wherein the composition is substantially free of water and the pH at 25° C. after dilution with water is less than 5.5.

The present invention also provides a stable solid insecticidal composition comprising:

(a) an effective amount of emamectin benzoate;
(b) an effective amount of cartap; and
(c) at least one pH adjuster;
wherein the water content is less than 0.5% by weight based on the total weight of the stable composition and the pH at 25° C. after dilution in water is less than 5.5.

In some embodiments, the pH is less than 5.1.

In some of the embodiments, the water content is between 0.2-0.5% by weight based on the total weight of the stable composition.

In some of the embodiments, the water content is between 0.2-0.5% by weight based on the total weight of the stable composition and the pH at 25° C. after dilution in water is equal to or less than 5.1.

In some embodiments the water content is equal to or less than 0.2% by weight based on the total weight of the composition.

In some embodiments, a stable solid insecticidal composition comprising:

(1) an effective amount of emamectin;
(2) an effective amount of cartap; and
(3) at least one pH adjuster;
wherein the composition is substantially free of water and the pH at 25° C. after dilution with water is equal to or less than 5.1.

In some embodiments, a stable solid insecticidal composition comprising:

(1) an effective amount of emamectin;
(2) an effective amount of cartap; and
(3) at least one pH adjuster;
wherein the water content is less than 0.5% by weight based on the total weight of the stable composition and the pH at 25° C. after dilution in water is equal to or less than 5.1.

In some embodiments, a stable solid insecticidal composition comprising:

(1) an effective amount of emamectin;
(2) an effective amount of cartap; and
(3) at least one pH adjuster;
wherein the water content is less than or equal to 0.2% by weight based on the total weight of the stable composition and the pH at 25° C. after dilution in water is equal to or less than 5.1.

In some embodiments, a stable solid insecticidal composition comprising:

(1) an effective amount of emamectin benzoate;
(2) an effective amount of cartap; and
(3) at least one pH adjuster;
wherein the composition is substantially free of water and the pH at 25° C. after dilution with water is equal to or less than 5.1.

In some embodiments, a stable solid insecticidal composition comprising:

(1) an effective amount of emamectin benzoate;
(2) an effective amount of cartap; and
(3) at least one pH adjuster;
wherein the water content is less than 0.5% by weight based on the total weight of the stable composition and the pH at 25° C. after dilution in water is equal to or less than 5.1.

In some embodiments, a stable solid insecticidal composition comprising:

(1) an effective amount of emamectin benzoate;
(2) an effective amount of cartap; and
(3) at least one pH adjuster;
wherein the water content is equal to or less than 0.2% by weight based on the total weight of the stable composition and the pH at 25° C. after dilution in water is equal to or less than 5.1.

In some of the embodiments, the water content is between 0.2-0.5% by weight based on the total weight of the stable composition.

In some of the embodiments, the water content is between 0.2-0.5% by weight based on the total weight of the stable composition and the pH at 25° C. after dilution in water is equal to or less than 5.1.

In some embodiments, the pH adjuster is buffer.

In some embodiments, the buffer is combination of citric acid and disodium mono hydrogen phosphate.

In some embodiments, the pH adjuster is combination of citric acid and disodium mono hydrogen phosphate.

The present invention further provides an improved stable solid composition comprising emamectin and cartap wherein the improvement comprises a reduced amount of water and presence of at least one pH adjuster for maintaining the pH of the composition after diluted in water at 25° C. at less than 5.5.

The present invention further provides an improved stable solid composition comprising emamectin and cartap wherein the improvement comprises water content less than 0.5% by weight based on the total weight of the stable composition and presence of at least one pH adjuster for maintaining the pH of the composition after dilution in water at 25° C. at less than 5.5.

The present invention further provides an improved stable solid composition comprising emamectin and cartap wherein the improvement comprises water content less than 0.5% by weight based on the total weight of the stable composition and presence of at least one pH adjuster for maintaining the pH of the composition after dilution in water at 25° C. at less than 5.1.

In some of the embodiments, the water content is between 0.2-0.5% by weight based on the total weight of the stable composition.

In some of the embodiments, the water content is between 0.2-0.5% by weight based on the total weight of the stable composition and the pH at 25° C. after dilution in water is equal to or less than 5.1.

In some embodiments, reduced amount is water content less than 0.5% % by weight based on the total weight of the stable composition.

In some embodiments, improved stable solid composition refers, but is not limited to degradation of the emamectin in the composition after storage equal to or less than 7%, 5%, or 4.5%, or 4%, or 3%, or 2.5%, or 2% or 1%.

In some embodiments, the degradation of emamectin in the composition is less than 2%.

In some embodiments, improved stable solid composition refers, but is not limited to degradation of the cartap in the composition after storage equal to or less than 5%, or 4%, or 3.5%, or 3%, 2.5%, 2%, or 1%.

In some embodiments, the composition is stored for 7 days at a temperature of 54° C. In some embodiments, the composition is stored for 10 days at a temperature of 54° C. In some embodiments, the composition is stored 14 days at a temperature of 54° C.

In some embodiments, the composition is stored at a temperature of between 20 to 55° C.

In some embodiments, the percentage of degradation is calculated based on the percentage of cartap and/or emamectin by weight based on the total weight of the stable composition before and after storage.

In some embodiments, water can be reduced from composition by any conventional method of drying.

In some embodiments the drying is of the end used composition.

Drying methods may be but are not limited to a tray drying and fluid bed drying.

In some embodiments, the pH adjusters may include but are not limited to buffers, bases and/or acidifiers.

In some embodiments the pH adjuster is a mixture of at least one base and at least one acid. In some embodiments the pH adjuster is a buffer.

In some embodiments the pH adjuster is an acid. In some embodiments the pH adjuster is a base.

Buffers refer to combinations of acids and bases. Acids include but are not limited to organic and inorganic acids. Bases include but are not limited to organic and inorganic bases.

Organic acids may include but are not limited to citric acid, formic acid, acetic acid, propionic acid, butyric acid, oxalic acid, lactic acid, malic acid, and benzoic acid.

Inorganic acids may include but are not limited to hydrochloric acid, nitric acid, phosphoric acid, sulfuric acid and boric acid.

Organic bases may include but are not limited to primary and secondary amines, pyridines, imidazole and benzimidazole.

Inorganic bases may include but are not limited to sodium bicarbonate and disodium mono hydrogen phosphate.

In some embodiments, the pH adjuster is a combination of citric acid and di sodium mono hydrogen phosphate.

In some embodiments, the pH value of the composition is measured by wetting the composition. The pH value is recorded as 1% in aqueous suspension.

In some embodiments, the pH value is recorded as 1% w/w composition in water.

It was found that reducing the amount of water in the composition as well as the pH value of the composition, decreases and controls the degradation rate of the active ingredients.

In some embodiments the compositions of the present invention, further comprises nutrients and/or fertilizer.

The present invention provides a stable solid insecticidal composition comprising:
  (a) emamectin benzoate in an amount of 0.1-4% by weight based on the total weight of the stable composition;
  (b) cartap in an amount of 7-10% by weight based on the total weight of the stable composition; and
  (c) at least one pH adjuster;
  wherein the composition is substantially free of water and the pH at 25° C. after dilution with water is less than 5.5.

The present invention also provides a stable solid insecticidal composition comprising:
  (a) emamectin benzoate in an amount of 0.1-4% by weight based on the total weight of the stable composition;
  (b) cartap in an amount of 7-10% by weight based on the total weight of the stable composition; and
  (c) at least one pH adjuster;
  wherein the water content is less than 0.5% by weight based on the total weight of the stable composition and the pH at 25° C. after dilution in water is less than 5.5.

In some embodiments, the amount of cartap is about 8% by weight based on the total weight of the stable composition.

In some embodiments, the amount of emamectin benzoate is about 0.25% by weight based on the total weight of the stable composition.

The present invention also provides a stable solid insecticidal composition comprising:
  (a) emamectin benzoate in an amount of about 0.25% by weight based on the total weight of the stable composition;
  (b) cartap in an amount of about 7.5% by weight based on the total weight of the stable composition; and
  (c) at least one pH adjuster;
  wherein the water content is less than 0.5% by weight based on the total weight of the stable composition and the pH at 25° C. after dilution in water is less than 5.5.

In some of the embodiments, the water content is between 0.2-0.5% by weight based on the total weight of the stable composition.

In some of the embodiments, the water content is between 0.2-0.5% by weight based on the total weight of the stable composition and the pH at 25° C. after dilution in water is equal to or less than 5.1.

In some embodiments the pH of the composition after dilution is equal to or less than about 5.1, or 4.5, or 4.1, or 3.5.

In some embodiments the pH of the composition after dilution is equal to or less than 5.1, or 4.5, or 4.1, or 3.5.

In some embodiments, the water content is less than 0.5%, or 0.4%, 0.3%, or 0.2%, or 0.1% by weight based on the total weight of stable composition.

In some embodiments, the water content is less than about 0.5%, or 0.4%, 0.3%, or 0.2%, or 0.1% by weight based on the total weight of stable composition.

In some embodiments, the composition contains water in amount of 0.2% by weight based on the total weight of stable composition.

In some embodiments, the composition contains water in amount of less than 0.2% by weight based on the total weight of stable composition.

In some embodiments, the water content in the composition is 0.2% by weight based on the total weight of said composition and the pH value is between 3.0-3.5.

In some embodiments, the water content in the composition is 0.2% by weight based on the total weight of said composition and the pH value is between 3.5-4.1.

In some embodiments, the water content in the composition is 0.2% by weight based on the total weight of said composition and the pH value is between 4.1-5.1.

In some embodiments, the water content in the composition is 0.3%-0.5% by weight based on the total weight of said composition and the pH value is between 3.0-3.5.

In some embodiments, the water content in the composition is 0.3%-0.5% by weight based on the total weight of said composition and the pH value is between 3.5-4.1.

In some embodiments, the water content in the composition is 0.3%-0.5% by weight based on the total weight of said composition and the pH value is between 4.1-5.1.

In some embodiments, the solid composition contains water in concentrations of equal to or less than 0.5%, or 0.4%, or 0.3%, or 0.2%, or 0.1% by weight based on the total weight of said composition.

In some embodiments, a stable solid insecticidal composition comprising:
(a) an effective amount of emamectin and/or derivative thereof;
(b) an effective amount of cartap; and
(c) at least one pH adjuster;
wherein the composition is substantially free of water and the pH at 25° C. after dilution with water is equal to or less than about 4.5.

In some embodiments, a stable solid insecticidal composition comprising:
(a) an effective amount of emamectin and/or derivative thereof;
(b) an effective amount of cartap; and
(c) at least one pH adjuster;
wherein the composition is substantially free of water and the pH at 25° C. after dilution with water is equal to or less than about 3.5.

In some embodiments, the pH adjuster is buffer.
In some embodiments, the buffer is combination of citric acid and disodium mono hydrogen phosphate.

In some embodiments, the pH adjuster is combination of citric acid and disodium mono hydrogen phosphate.

In some embodiments, water can be reduced from composition by any conventional method of drying.

In some embodiments the drying is of the end used composition.

Drying methods may be but are not limited to a tray drying and fluid bed drying.

In some embodiments, the pH adjusters may include but are not limited to buffers, bases and/or acidifiers.

In some embodiments the pH adjuster is a mixture of at least one base and at least one acid.

In some embodiments the pH adjuster is a buffer.

In some embodiments the pH adjuster is an acid. In some embodiments the pH adjuster is a base.

Buffers refer to combinations of acids and bases. Acids include but are not limited to organic and inorganic acids. Bases include but are not limited to organic and inorganic bases.

Organic acids may include but are not limited to citric acid, formic acid, acetic acid, propionic acid, butyric acid, oxalic acid, lactic acid, malic acid, and benzoic acid.

Inorganic acids may include but are not limited to hydrochloric acid, nitric acid, phosphoric acid, sulfuric acid and boric acid.

Organic bases may include but are not limited to primary and secondary amines, pyridines, imidazole and benzimidazole.

Inorganic bases may include but are not limited to sodium bicarbonate and disodium mono hydrogen phosphate.

In some embodiments, the pH adjuster is combination of citric acid and di sodium mono hydrogen phosphate.

In some embodiments, the pH value of the composition is measured by wetting the composition. The pH value is recorded as 1% in aqueous suspension. In some embodiments, the pH value is recorded as 1% w/w composition in water.

In some embodiments the compositions of the present invention, further comprises nutrients and/or fertilizer.

The present invention also provides a stable solid insecticidal composition comprising:
(a) an effective amount of emamectin and/or derivative thereof
(b) an effective amount of cartap; and
(c) at least one pH adjuster;
wherein the water content is equal or equal to or less than 0.2% by weight based on the total weight of the stable composition and the pH at 25° C. after dilution in water is equal to or less than about 4.5.

The present invention also provides a stable solid insecticidal composition comprising:
(a) an effective amount of emamectin and/or derivative thereof;
(b) an effective amount of cartap; and
(c) at least one pH adjuster;
wherein the water content is equal to or equal to or less than 0.2% by weight based on the total weight of the stable composition and the pH at 25° C. after dilution in water is equal to or less than about 3.5.

The present invention also provides a stable solid insecticidal composition comprising:
(a) an effective amount of emamectin and/or derivative thereof;
(b) an effective amount of cartap; and
(c) at least one pH adjuster;
wherein the water content is equal to or less than or equal to 0.2% by weight based on the total weight of the stable composition and the pH at 25° C. after dilution in water is between about 3.5-5.5.

In some embodiments, emamectin derivative thereof refers to benzoate.

In some embodiments, a stable solid insecticidal composition comprising:
(a) emamectin benzoate in an amount of 0.1-4% by weight based on the total weight of the stable composition;
(b) cartap in an amount of 7-10% by weight based on the total weight of the stable composition; and
(c) at least one pH adjuster;
wherein the composition is substantially free of water and the pH at 25° C. after dilution with water is equal to or less than 5.1.

In some embodiments, a stable solid insecticidal composition comprising:
(a) emamectin benzoate in an amount of 0.1-4% by weight based on the total weight of the stable composition;
(b) cartap in an amount of 7-10% by weight based on the total weight of the stable composition; and
(c) at least one pH adjuster;
wherein the water content is equal to or less than 0.2% by weight based on the total weight of the stable composition and the pH at 25° C. after dilution in water is equal to or less than 5.1.

In some embodiments, a stable solid insecticidal composition comprising:
(a) emamectin benzoate in an amount of about 0.25% by weight based on the total weight of the stable composition;
(b) cartap in an amount of about 7.5% by weight based on the total weight of the stable composition; and
(c) at least one pH adjuster;
wherein the water content is equal to or less than 0.2% by weight based on the total weight of the stable composition and the pH at 25° C. after dilution in water is equal to or less than 5.1.

In some embodiments, a stable solid insecticidal composition comprising:
(a) emamectin benzoate in an amount of about 0.25% by weight based on the total weight of the stable composition;
(b) cartap in an amount of about 7.5% by weight based on the total weight of the stable composition; and
(c) at least one pH adjuster;
wherein the water content is substantially free of water and the pH at 25° C. after dilution in water is equal to or less than 5.1.

The present invention also provides a stable solid insecticidal composition comprising:
(a) emamectin benzoate in an amount of 0.1-4% by weight based on the total weight of the stable composition;
(b) cartap in an amount of 7-10% by weight based on the total weight of the stable composition; and
(c) at least one pH adjuster;
wherein the water content is less than 0.5% by weight based on the total weight of the stable composition and the pH at 25° C. after dilution in water is less than 5.1.

The present invention also provides a stable solid insecticidal composition comprising:
(a) emamectin benzoate in an amount of about 0.25% by weight based on the total weight of the stable composition;
(b) cartap in an amount of about 7.5% by weight based on the total weight of the stable composition; and
(c) at least one pH adjuster;
wherein the water content is less than 0.5% by weight based on the total weight of the stable composition and the pH at 25° C. after dilution in water is less than 5.1.

In some embodiments the pH adjuster is buffer.

In some embodiments, the buffer is combination of citric acid and disodium mono hydrogen phosphate.

In some embodiments, the pH adjuster is combination of citric acid and disodium mono hydrogen phosphate.

In some embodiments, water can be reduced from composition by any conventional method of drying.

In some embodiments the drying is of the end used composition.

Drying methods may be but are not limited to a tray drying and fluid bed drying.

In some embodiments, the pH adjusters may include but are not limited to buffers, bases and/or acidifiers.

In some embodiments the pH adjuster is a mixture of at least one base and at least one acid.

In some embodiments the pH adjuster is a buffer.

In some embodiments the pH adjuster is an acid. In some embodiments the pH adjuster is a base.

Buffers refer to combinations of acids and bases. Acids include but are not limited to organic and inorganic acids. Bases include but are not limited to organic and inorganic bases.

Organic acids may include but are not limited to citric acid, formic acid, acetic acid, propionic acid, butyric acid, oxalic acid, lactic acid, malic acid, and benzoic acid.

Inorganic acids may include but are not limited to hydrochloric acid, nitric acid, phosphoric acid, sulfuric acid and boric acid.

Organic bases may include but are not limited to primary and secondary amines, pyridines, imidazole and benzimidazole.

Inorganic bases may include but are not limited to sodium bicarbonate and disodium mono hydrogen phosphate.

In some embodiments, the pH adjuster is combination of citric acid and di sodium mono hydrogen phosphate.

In some embodiments, the pH value of the composition is measured by wetting the composition. The pH value is recorded as 1% in aqueous suspension. In some embodiments, the pH value is recorded as 1% w/w composition in water.

In some embodiments, the compositions of the present invention, further comprises nutrients and/or fertilizer.

Nutrients may be but are not limited to Zinc, Iron, Boron, Copper, Manganese and Molybdenum Nutrients can be a free, salt, chelated derivative with chelating agent or combination thereof.

Chelating agents may be but are not limited to ethylenediaminetetraacetic acid (EDTA), diethylenetriaminepentaacetic acid (DTPA), N-(hydroxyethyl)-ethylenediaminetriacetic acid) (HEDTA) and ethylenediamine-N,N'-bis(2-hydroxyphenylacetic acid)(EDDHA).

In some embodiments, the concentration of nutrient and/or fertilizer in the stable composition is between 0.1 to 20 g/Kg. In some embodiments, the concentration of nutrient in the stable composition is between 1 to 10 g/Kg. In some embodiments, the concentration of nutrient in the stable composition is about 1.08 g/Kg.

In some embodiments, the amount of the nutrient and/or fertilizer in the stable composition is about 10% by weight based on the total weight of the stable composition. In some embodiments, the amount of the nutrient and/or fertilizer is about 5% by weight based on the total weight of the stable composition. In some embodiments, the amount of the nutrient and/or fertilizer in the stable composition is about 1% by weight based on the total weight of the stable composition.

In some embodiments, the composition further comprises an agriculturally acceptable carrier. In some embodiments, the agriculturally acceptable carrier is an inert solid. In some embodiments, the inert solids include but are not limited to sand, gypsum, bentonite, china clay and lactose.

In some embodiments, the amount of the carrier in the stable solid composition is 10-90% by weight based on the total weight of the stable composition. In some embodiments, the amount of the carrier is 40-80% by weight based on the total weight of the stable composition. In some embodiments, the amount of the carrier is 50-60% by weight based on the total weight of the stable composition. In some embodiments, the amount of the carrier is 15-50% by weight based on the total weight of the stable composition. In some embodiments, the amount of the carrier is 20-40% by weight based on the total weight of the stable composition.

In some embodiments, the concentration of the carrier in the stable solid composition is 400-900 g/kg. In some embodiments, the concentration of the carrier in the stable composition is 400-700 g/kg. In some embodiments, the concentration of the carrier in the stable composition is 500-600 g/kg. In some embodiments, the concentration of the carrier in the stable composition is 575-600 g/Kg.

In some embodiments, the composition further comprises an agriculturally acceptable binder. In some embodiments, the agriculturally acceptable binders may include, but are not limited to starch, dextrin, gums, lignosulfonate, polymers and oils.

Examples of polymers are polyvinyl alcohol, polyvinyl pyrrolidone and polyethylene glycol.

In some embodiments, the binder is a copolymer of poly vinyl pyrrolidone and vinyl acetate.

In some embodiments, the polyvinyl pyrrolidone is a copolymer of poly vinyl pyrrolidone and vinyl acetate.

In some embodiments, the binder is Agrimer™ VA6.

Oils refer to natural and synthetic oils. Synthetic oils include but are not limited to machine oils, vegetable oil, coal tars. Natural oils include but are not limited to vegetable oil.

In some embodiments, the amount of the binder in the stable composition is 0.45%-1.0% by weight based on the total weight of the stable composition. In some embodiments, the amount of the binder in the stable composition is about 0.6% by weight based on the total weight of the stable composition.

In some embodiments, the amount of emamectin in the stable solid composition is 0.1-80% by weight based on the total weight of the stable composition. In some embodiments, the amount of emamectin is 0.1-70% by weight based on the total weight of the stable composition. In some embodiments, the amount of emamectin is 1-60% by weight based on the total weight of the stable composition. In some embodiments, the amount of emamectin is 5-50% by weight based on the total weight of the stable composition. In some embodiments, the amount of emamectin is 1-15% by weight based on the total weight of the stable composition. In some embodiments, the amount of emamectin is 0.1-20% by weight based on the total weight of the stable composition. In some embodiments, the amount of emamectin is about 3% by weight based on the total weight of the stable composition. In some embodiments, the amount of emamectin is 0.25% by weight based on the total weight of the stable composition.

In some embodiments, the concentration of emamectin in the stable solid composition is between 1 to 800 g/Kg. In some embodiments, the concentration of emamectin in the stable composition is between 2 to 20 g/Kg. In some embodiments, the concentration of emamectin in the stable composition is between 2 to 10 g/Kg. In some embodiments, the concentration of emamectin in the stable composition is about 2.7 g/Kg.

In some embodiments, the amount of cartap in the stable solid composition is 0.1-80% by weight based on the total weight of the stable composition. In some embodiments, the amount of cartap is 0.1-70% by weight based on the total weight of the stable composition. In some embodiments, the amount of cartap is 1-60% by weight based on the total weight of the stable composition. In some embodiments, the amount of cartap is 5-50% by weight based on the total weight of the stable composition. In some embodiments, the amount of cartap is 1-15% by weight based on the total weight of the stable composition. In some embodiments, the amount of cartap is 10-25% by weight based on the total weight of the stable composition. In some embodiments, the amount of cartap is about 8.4% by weight based on the total weight of the stable composition. In some embodiments, the amount of cartap is about 8.11% by weight based on the total weight of the stable composition.

In some embodiments, the concentration of cartap in the stable solid composition is between 1 to 800 g/Kg. In some embodiments, the concentration of cartap in the stable composition is about 83 g/Kg In some embodiments, the concentration of cartap in the stable composition is about 25 g/Kg. In some embodiments, the concentration of cartap in the stable composition is about 8.11 g/Kg.

In some embodiments, the amount of pH adjuster(s) in the stable solid composition is 0.1-5% by weight based on the total weight of the stable composition.

In some embodiments, the pH adjuster is citric acid and/or disodium monohydrogen phosphate.

In some embodiments, the weight ratio between the pH adjusters is 100:1 to 1:100. In some embodiments, the weight ratio between the pH adjusters is 10:1 to 1:10. In some embodiments, the weight ratio between the pH adjusters is 5:1 to 1:5.

In some embodiments, the weight ratio between the pH adjusters is about 2.4:1

In some embodiments, the weight ratio between the pH adjusters is about 3.3:1

In some embodiments, the composition further comprises agriculturally acceptable inert additives.

Agriculturally acceptable inert additives refer but are not limited to anti-oxidation agents, de-foaming agents, dye, Pigment, flavoring agent, dispersing agent, synergists, encapsulates, photo-stabilizer, Binder, sticker, water soluble fertilizers, repellents and sensitizers.

Anti-oxidation agents include but are not limited to clay, BHA, BHT, TBH, Propyl gallate, Sodium thiosulphate, Tocopherol, Pyrogallol and Epichlorohydrin.

Defoaming agents include but are not limited to organo-silicones, EO/PO based defoamers, alkyl polyacrylates.

Dyes include but are not limited to acid dye, basic dye, natural dye, synthetic dye and azo dye.

In some embodiments the composition further comprises a wetting agent.

Wetting agents include but are not limited to nonionic and ionic derivatives.

Examples of wetters that may be used in the compositions of the subject invention include but are not limited to di alkyl naphthalene sulfonate, di alkyl sulfosuccinate, metal salt of alkyl ether sulfonate, alpha olefin sulfonate, N-acyl N-alkyl taurate, linear alkyl benzene sulfonates, carboxylates, sulphates, phosphate esters, polyoxyethylene surfactants, ethoxylated alkyl phenols, ethoxylated aliphatic alcohols, anhydrosorbitol esters and Cetyltrimethylammonium bromide.

In some embodiments, the amount of wetting agent present in the stable composition is between 0.1-40% by weight based on the total weight of the stable composition. In some embodiments, the amount of wetting agent present in the stable composition is between 0.1-35% by weight based on the total weight of the stable composition. In some embodiments, the amount of wetting agent present in the stable composition is between 0.1-30% by weight based on the total weight of the stable composition. In some embodiments, the amount of wetting agent present in the stable composition is between 1-20% by weight based on the total weight of the stable composition. In some embodiments, the amount of wetting agent present in the stable composition is between 5-10% by weight based on the total weight of the stable composition. In some embodiments, the amount of wetting agent present in the stable composition is about 17% by weight based on the total weight of the stable composition.

In some embodiments, the composition comprises at least one surfactant.

Surfactants may include but are not limited to alcohol polyglycol ether, alkyl-end-capped ethoxylate glycol, alkyl-end-capped alkyl block alkoxylate glycol, dialkyl sulfosuccinate, phosphated esters, alkyl sulfonates, alkyl aryl sulfonates, tristyrylphenol alkoxylates, natural or synthetic fatty acid alkoxylates, natural or synthetic fatty alcohols alkoxylates, alkoxylated alcohols (such as n-butyl alcohol poly glycol ether), block copolymers (such as ethylene oxide-propylene oxide block copolymers and ethylene oxide-butylene oxide block copolymers) or combinations thereof.

In some embodiments, the surfactant is an alkyl-end-capped alkoxylate. In some embodiments, the adjuvant is a methyl-end-capped ethoxylate. In some embodiments, the adjuvant is a methyl-end-capped tridecyl ethoxylate. In some embodiments, the adjuvant is a methyl-end-capped tridecyl ethoxylate with six ethylene oxides.

In some embodiments, the surfactant is di isopropyl naphthalene sulfonate.

In some embodiments, the amount of surfactants present in the stable composition is between 0.1-40% by weight based on the total weight of the stable composition. In some embodiments, the amount of surfactants present in the stable composition is between 0.1-35% by weight based on the total weight of the stable composition. In some embodiments, the amount of surfactants present in the stable composition is between 0.1-30% by weight based on the total weight of the stable composition.

In some embodiments, the amount of surfactants present in the stable composition is between 1-20% by weight based on the total weight of the stable composition. In some embodiments, the amount of surfactants present in the stable composition is between 5-10% by weight based on the total weight of the stable composition. In some embodiments, the amount of surfactants present in the stable composition is about 17% by weight based on the total weight of the composition.

In some embodiments, the composition further includes an adjuvant.

In some embodiments, the adjuvant is selected from a group consisting of alkyl ethoxylate glycol, alkyl block alkoxylate glycol, alkyl-end-capped ethoxylate glycol, alkyl-end-capped alkyl block alkoxylate glycol, dialkyl sulfosuccinate, ethoxylated alcohols, phosphated esters, ethoxylated tristyryl phenol phosphate, sorbitan esters, Tween™ esters and combinations thereof.

In some embodiments, the adjuvant is added to the composition as a tank-mix. The adjuvant may be added simultaneously or separately with the composition of the present invention.

In some embodiments, the adjuvant is present in an amount of at least 10% by weight based on the total weight of the stable composition. In some embodiments, the adjuvant is present in an amount of at least 15% by weight based on the total weight of the stable composition. In some embodiments, the adjuvant is present in an amount of at least 20% by weight based on the total weight of the stable composition. In some embodiments, the adjuvant is present in an amount of at least 30% by weight based on the total weight of the stable composition.

Other examples of adjuvants that may be used in the compositions of the subject invention include but are not limited to sticking agents, spreading agents, synergists, penetrants, compatibility agents and drift retardants.

Other ingredients, such as adhesives, neutralizers, binders, sequestrates, biocides, stabilizers, buffers, preservatives or anti-freeze agents, may also be added to the present compositions in order to increase the stability, density, and viscosity of the described compositions.

In some embodiments, the composition is stable after 7 days in storage at a temperature of 54° C. In some embodiments, the composition is stable after 10 days in storage at a temperature of 54° C. In some embodiments, the composition is stable after 14 days in storage at a temperature of 54° C.

In some embodiments, the composition is stored at a temperature of between 20 to 55° C.

In some embodiments, the degradation of emamectin in the composition is equal to or less than 7%, 5%, or 4.5%, or 4%, or 3%, or 2.5%, or 2% or 1%.

In some embodiments, the degradation of emamectin in the composition is less than 2%.

In some embodiments, the degradation of cartap in the composition is equal to or less than 5%, or 4%, or 3.5%, or 3%, 2.5%, 2%, or 1%.

In some embodiments, stable solid composition refers, but is not limited to degradation of emamectin in the composition after storage, equal to or less than 7%, 5%, or 4.5%, or 4%, or 3%, or 2.5%, or 2% or 1%.

In some embodiments, the degradation of emamectin in the composition is less than 2%.

In some embodiments, stable solid composition refers, but is not limited to degradation of cartap in the composition after storage equal to or less than 5%, or 4%, or 3.5%, or 3%, 2.5%, 2%, or 1%.

In some embodiments, the composition is stored for 7 days at a temperature of 54° C. In some embodiments, the composition is stored for 10 days at a temperature of 54° C. In some embodiments, the composition is stored for 14 days at a temperature of 54° C.

In some embodiments, the composition is stored at a temperature of between 20 to 55° C.

The present invention provides a stable solid insecticidal composition comprising:
(a) emamectin benzoate in an amount of about 0.25% by weight based on the total weight of the stable composition;
(b) cartap in an amount of about 7.5% by weight based on the total weight of the stable composition;
(c) at least one pH adjuster; and
(d) zinc EDTA in amount of about 1% by weight based on the total weight of the stable composition;
wherein the composition is substantially free of water and the pH at 25° C. after dilution with water is equal to or less than 5.1.

The present invention provides a stable solid insecticidal composition comprising:
(a) emamectin benzoate in an amount of about 0.25% by weight based on the total weight of the stable composition;
(b) cartap in an amount of about 7.5% by weight based on the total weight of the stable composition;
(c) at least one pH adjuster; and
(d) zinc EDTA in amount of about 1% by weight based on the total weight of the stable composition wherein the water content is equal to or less than 0.2% by weight based on the total weight of the stable composition and the pH at 25° C. after dilution with water is equal to or less than 5.1.

The present invention also provides a stable solid insecticidal composition comprising:
(a) emamectin benzoate in an amount of 0.25% by weight based on the total weight of the stable composition;
(b) cartap in an amount of 7.5% by weight based on the total weight of the stable composition;
(c) at least one pH adjuster; and
(d) zinc EDTA 1%
wherein the water content is equal to or less than 0.2% by weight based on the total weight of the stable composition and the pH at 25° C. after dilution in water is equal to or less than 5.5.

In some embodiments, pH is equal or less than 5.1.

In some embodiments, the degradation of cartap in the composition is less than 0.5%.

The present invention further provides an improved stable solid composition comprising emamectin and cartap wherein the improvement comprises a reduced amount of water and presence of at least one pH adjuster for maintaining the pH of the composition after diluted in water at 25° C. at less than 5.5.

In some embodiments, reduced amount refers to water content less than 0.5% by weight based on the total weight of the stable composition.

In some embodiments, improved stable solid composition refers but is not limited to degradation of the emamectin in the composition after storage equal to or less than 7%, 5%, or 4.5%, or 4%, or 3%, or 2.5%, or 2% or 1%.

In some embodiments, the degradation of emamectin in the composition is less than 2%.

In some embodiments, improved stable solid composition refers but is not limited to degradation of the cartap in the composition after storage equal to or less than 5%, or 4%, or 3.5%, or 3%, 2.5%, 2%, or 1%.

In some embodiments, the composition is stored for 7 days at a temperature of 54° C. In some embodiments, the composition is stored for 10 days at a temperature of 54° C. In some embodiments, the composition is stored 14 days at a temperature of 54° C.

In some embodiments, the composition is stored at a temperature of between 20 to 55° C.

In some embodiments, the percentage of degradation is calculated based on the percentage of cartap and/or emamectin by weight based on the total weight of the stable composition before and after storage.

In some embodiments, the stable composition is a granular composition. In some embodiments, the stable composition is a powder composition. In some embodiments, the stable composition is a dispersable granules composition. In some embodiments, the stable composition is a dispersable powder composition.

The stable insecticidal composition described herein may be mixed with water and/or fertilizers and may be applied to a desired locus by any means, such as by airplane spray tanks, knapsack spray tanks, farm equipment used in ground spraying (e.g., boom sprayers, hand sprayers), and the like. The desired locus may be soil, plants, water and the like.

The stable insecticidal composition described herein may be mixed with water and/or fertilizers and may be applied to a desired locus by scattering.

The present invention also provides a package comprising any one of the compositions described herein, wherein the package is appropriate for packaging the composition described herein.

In some embodiments, the package impermeable to moisture.

The present invention also provides a package comprising any one of the compositions described herein, wherein the package is impermeable to moisture. As used herein, the term "impermeable" when used to characterize a package means that the package is sufficiently impermeable to moisture such that the low reduced water content comprised in the composition contained in the package is not substantially changed when the package is exposed to humid air.

For example, the package may be made of aluminum metallized film laminates such as bi-laminated aluminium pouch and tri-laminated aluminium pouch.

The present stable insecticidal composition may include additional crop protection agents, for example other insecticides, herbicides, fungicides, bactericides, nematicides, molluscicides, growth regulators, biological agents, fertilizers, or mixtures thereof. When used in conjunction with additional crop protection agents, the composition can be formulated with these co-agents, tank mixed with these co-agents or applied sequentially with these co-agents.

Further, the agricultural compositions herein may be used in conjunction with one or more other pesticides to control a wider variety of undesirable pests. In addition, the herein described composition may, optionally, be combined with or blended with other pesticide composition(s). This blend with pesticide composition(s) may be used to control pests in crops and non-crop environments.

Method for Reducing and Controlling the Degradation of the Active Ingredients:

The present invention further provides a method for controlling the degradation of emamectin and cartap, the method comprising formulating a composition comprising a reduced amount of water and at least one pH adjuster for maintaining the pH at 25° C. after dilution in water at less than 5.5.

The present invention further provides a method for controlling the degradation of emamectin and cartap in a composition, the method comprising formulating a composition comprising a reduced amount of water and at least one pH adjuster for maintaining the pH at 25° C. after dilution in water at less than 5.5.

The present invention further provides a method for controlling the degradation of emamectin in a composition which comprises emamectin and cartap, the method comprising formulating a composition comprising a reduced amount of water and at least one pH adjuster for maintaining the pH at 25° C. after dilution in water at less than 5.5.

The present invention further provides a method for controlling the degradation of emamectin and cartap, the method comprising reducing the amount of water in the composition and adding at least one pH adjuster for maintaining the pH at 25° C. after dilution in water at less than 5.5.

In some embodiments, reduced amount of water is less than 0.5% by weight based on the total weight of the stable composition.

In some embodiments, pH of the composition after dilution in water at 25° C. is less than 5.1.

The present invention provides a method for increasing the chemical stability of composition comprising emamectin and cartap, the method comprising formulating a composition comprising a reduced amount of water less than 0.5% by weight based on the weight of the composition and at least one pH adjuster for maintaining the pH at 25° C. after dilution in water at less than 5.5.

The present invention provides a method for increasing the chemical stability of emamectin and cartap, the method comprising formulating a composition comprising a reduced amount of water less than 0.5% by weight based on the weight of the composition and at least one pH adjuster for maintaining the pH at 25° C. after dilution in water at less than 5.5.

The present invention further provides a method for controlling the degradation of emamectin and cartap, the method comprising formulating a composition comprising (a) an effective amount of emamectin and/or derivative thereof; (b) an effective amount of cartap; (c) a reduced amount of water less than 0.5% by weight based on the total weight of the stable composition and (d) at least one pH adjuster for maintaining the pH at 25° C. after dilution in water at less than 5.5.

The present invention provides a method for increasing the chemical stability of emamectin and/or cartap, the method comprising formulating a composition comprising a reduced amount of water less than 0.5% by weight based on the weight of the composition and at least one pH adjuster for maintaining the pH at 25° C. after dilution in water at less than 5.5.

The present invention further provides a method for controlling the degradation of emamectin and/or cartap, the method comprising formulating a composition comprising (a) an effective amount of emamectin and/or derivative thereof; (b) an effective amount of cartap; (c) a reduced amount of water less than 0.5% by weight based on the total weight of the stable composition and (d) at least one pH adjuster for maintaining the pH at 25° C. after dilution in water at less than 5.5.

The present invention provides a method for increasing the chemical stability of emamectin, the method comprising formulating a composition comprising a reduced amount of water less than 0.5% by weight based on the weight of the composition and at least one pH adjuster for maintaining the pH at 25° C. after dilution in water at less than 5.5.

The present invention provides a method for increasing the chemical stability of emamectin in composition comprising emamectin and cartap, the method comprising formulating a composition comprising a reduced amount of water less than 0.5% by weight based on the weight of the composition and at least one pH adjuster for maintaining the pH at 25° C. after dilution in water at less than 5.5.

The present invention provides a method for increasing the chemical stability of emamectin, the method comprising formulating a composition comprising a reduced amount of water less than 0.5% by weight based on the weight of the composition and at least one pH adjuster for maintaining the pH at 25° C. after dilution in water at less than 5.1.

The present invention provides a method for increasing the chemical stability of emamectin, the method comprising formulating a composition comprising a reduced amount of water between 0.2%-0.5% by weight based on the weight of the composition and at least one pH adjuster for maintaining the pH at 25° C. after dilution in water at less than 5.1.

The present invention provides a method for increasing the chemical stability of emamectin, the method comprising formulating a composition comprising a reduced amount of water less than 0.2% by weight based on the weight of the composition and at least one pH adjuster for maintaining the pH at 25° C. after dilution in water at less than 5.1.

The present invention provides a method for increasing the chemical stability of emamectin, the method comprising formulating a composition comprising a reduced amount of water less than 0.2% by weight based on the weight of the composition and at least one pH adjuster for maintaining the pH at 25° C. after dilution in water at less than 5.1.

In some embodiment the pH of the composition is equal to or less than 5.1, or 4.5, or 4, or 3.5.

In some embodiments, reduced amount of water is between 0.2%-0.5% by weight based on the total weight of the stable composition.

In some embodiment, the water content is less than 0.5%, or 0.4%, 0.3% or 0.2% based on the total weight of said composition.

In some embodiments, the composition contains 0.2% water.

In some embodiments, the composition contains less than 0.2% water.

In some embodiments, the water content in the composition is 0.2% by total weight of said composition and the pH value is between 3.0-3.5.

In some embodiments, the water content in the composition is 0.2% based on the total weight of said composition and the pH value is between 3.5-4.1.

In some embodiments, the water content in the composition is 0.2% by weight based on the total weight of said composition and the pH value is between 4.1-5.1.

In some embodiments, the water content in the composition is 0.3%-0.5% by weight based on the total weight of said composition and the pH value is between 3.0-3.5.

In some embodiments, the water content in the composition is 0.3%-0.5% by weight based on the total weight of said composition and the pH value is between 3.5-4.1.

In some embodiments, the water content in the composition is 0.3%-0.5% by weight based on the total weight of said composition and the pH value is between 4.1-5.1.

In some embodiments, the solid composition contains water in concentrations of equal to or less than 0.5%, or 0.3%, or 0.2% or 0.1% by total weight of said composition.

In some embodiments, the pH adjusters may include but are not limited to buffers, bases and/or acidifiers.

In some embodiments the pH adjuster is a mixture of at least one base and at least one acid.

In some embodiments the pH adjuster is an acid. In some embodiments the pH adjuster is a base.

Buffers refer to combinations of acids and bases. Acids include but are not limited to organic and inorganic acids. Bases include but are not limited to organic and inorganic bases.

Organic acids may include but are not limited to citric acid, formic acid, acetic acid, propionic acid, butyric acid, oxalic acid, lactic acid, malic acid, and benzoic acid.

Inorganic acids may include but are not limited to hydrochloric acid, nitric acid, phosphoric acid, sulfuric acid and boric acid.

Organic bases may include but are not limited to primary and secondary amines, pyridines, imidazole and benzimidazole.

Inorganic bases may include but are not limited to sodium bicarbonate and disodium mono hydrogen phosphate.

In some embodiments, the pH adjuster is a combination of citric acid and di sodium mono hydrogen phosphate.

In some embodiments, the pH value of the composition is measured by wetting the composition. The pH value is recorded as 1% in aqueous suspension. In some embodiments, the pH value is recorded as 1% w/w composition in water.

It was found that by reducing the amount of water as well as the pH value of the composition, the degradation of the active ingredients is controlled. As the amount of water in the composition is increased, the degradation level of emamectin and cartap increases. Cartap degradation was not found correlated with water content up to 0.5% moisture.

In some embodiments, as the pH value of the composition is increased, the degradation level of emamectin and cartap is increased.

In some embodiments, less than 5% degradation of emamectin was observed when the water content in the composition was equal to or less than 0.2% by weight based on the total weight of the stable composition and the pH value was in the range of 3.5-5.1.

In some embodiments, less than 5% degradation of emamectin was observed when the water content was equal to or less than 0.2% by weight based on the total weight of the stable composition and the pH value was in the range of 3.5-4.1.

Methods of Use of the Compositions

The compositions described herein are suitable for the control of insects.

The subject invention also provides a method for controlling insects comprising applying the stable insecticidal solid formulation described herein to a rice field or to an area or soil adjacent to an insect.

The composition can be applied as a pre emergence or post emergence treatment.

The subject invention also provides a method of controlling insect comprising:
(a) obtaining a stable insecticidal composition according the present invention;
(b) applying the stable insecticide composition to a crop, a portion of a crop, an area or soil adjacent to an insect, and/or a seed of a crop so as to thereby control the insect.

Methods include adding the stable insecticidal composition to a carrier such as water and using the resulting composition containing the insecticidal stable composition for spray applications to control insects in plant or plant propagation material thereof. By diluting the stable insecticidal composition in water, a dispersion or solution may be formed.

The stable insecticidal composition described herein may be applied by scattering a granular composition of the present invention onto a rice field or to an area or soil adjacent to an insect.

Effective application rates of the insecticidal composition cannot generally be defined, as it varies depending upon various conditions such as the type of insect, weather conditions, and nature of the soil.

In one embodiment, the stable insecticidal composition is applied at a rate of about 1 to about 10 Kg/ha. In some embodiments, the stable insecticidal composition is applied at a rate of about 4 to 8 Kg/ha. In a specific embodiment the stable insecticidal composition is applied at a rate of about 5 Kg/ha. In another specific embodiment the stable insecticidal composition is applied at a rate of about 8 Kg/ha. In another specific embodiment the stable insecticidal composition is applied at a rate of about 7.5 Kg/ha.

In an embodiment, the stable insecticidal composition may be diluted in a carrier such as water in an amount of from about 1 to 100 L of the stable composition per 1000 L of water. In a further embodiment, the stable insecticidal composition may be diluted in a carrier such as water in an amount of from about 1 to 30 L of the stable composition per 1000 L of water. In yet another embodiment, the stable insecticidal composition may be diluted in a carrier such as water in an amount of from about 5 to 15 L of the stable composition per 1000 L of water.

The present invention also provides a method for controlling insect stress in the vicinity of a rice crop, comprising applying the stable insecticidal solid composition described herein to a rice field.

The present invention also provides a method for controlling insect stress in the vicinity of crop, comprising applying the stable insecticidal solid composition described herein to a crop field. In some embodiments, the crops include but are not limited to cereals, rice, vegetables, pulses, corn and sugarcane.

In some embodiments, the insect to be controlled by the stable insecticidal composition described may include, but is not limited to Yellow Stem Borer, Early shoot borer and Stem borer, top shoot borer and internode borer.

In some embodiments, the composition may be in the form of granules.

In some embodiments, the granules are applied before flooding the field with water.

In some embodiments, the granules are applied to a flooded field.

In some embodiments, the granules are first diluted in water and then applied to the rice field.

In some embodiments, the insecticidal composition is applied at a rate from 0.1 liter/ha to 10 liter/ha.

In some embodiments, the insecticidal composition is applied at a rate from 0.2 liter/ha to 5 liter/ha.

In some embodiments, the insecticidal composition is applied at a rate of 1.25 liter/ha.

Processes of Preparation for the Compositions Described Herein

The present invention provides a process for preparing the stable composition as described herein.

The present invention provides a process for preparing a stable solid insecticidal composition wherein the process comprises the steps of:
(a) preparing a premix of the emamectin, cartap, at least one pH adjuster and other agrochemicals acceptable inert additives (b) activating the carrier with a binder;
(c) coating the activated carrier of step (b) with the premix (a) or spraying the premix (a) over the activated carrier of step (b); and
optionally, (d) drying the resulting mixture of step (c).

In some embodiments, preparing premix includes (a) mixing emamectin benzoate with at least one pH adjuster and other agrochemically acceptable inert additives;
(b) milling the mixture;
(c) adding cartap hydrochloride to the resulting mixture of step (b); and optionally (c) milling the resulting mixture to obtain powder.

In some embodiments, the pH adjuster in step (a) is disodium mono hydrogen phosphate.

In some embodiments, the pH adjuster added in step (c) is citric acid.

The present invention provides a process for preparing a stable solid insecticidal composition the process comprising the steps of:
(a) preparing a premix of the emamectin, cartap, at least one pH adjuster and other agrochemicals acceptable inert additives;
(b) milling the mixture to obtain powder;
(c) activating the carrier with a binder;
(d) coating the activated carrier of step (c) with the powder of (b) or spraying the powder (b) over the activated carrier of step (c); and optionally
(e) drying the resulting mixture of step (d)

In some embodiments, the pH adjuster is buffer.

In some embodiments, the process further comprises a step of drying.

Drying methods may be but are not limited to a tray drying and fluid bed drying.

The present invention further provides a process for preparing a stable solid insecticidal composition wherein the process comprises the steps of:
(a) preparing a powder blend of emamectin benzoate, a pH adjuster and other agrochemically acceptable inert additives;
(b) preparing a powder blend of cartap, a pH adjuster and other agrochemically acceptable inert additives;
(c) preparing a solution comprising a binder;
(d) multilayer coating of inert carrier with (a) and (b) using solution (c); and
Optionally, (e) drying the resulting mixture of step (d).

In some embodiments, the pH adjuster in step (a) is disodium mono hydrogen.

In some embodiments, the pH adjuster in step (b) is citric acid.

In some embodiments, the process comprises granulating the coated carrier to obtain granules.

In some embodiments, multilayer refers to at least two layers.

In some embodiments, multilayer refers to at least three layers.

In some embodiments, the multilayer refers to first coating with cartap followed by emamectin.

In some embodiments, the multilayer refers to first coating with emamectin followed by cartap.

In some embodiments, the carrier is first coated with cartap.

In some embodiments, the carrier is first coated with emamectin.

In some embodiments, the process further comprises a step of drying.

Drying methods may be but are not limited to a tray drying and fluid bed drying.

In some embodiments, the pH adjusters may include but are not limited to buffers, bases and/or acidifiers.

In some embodiments the pH adjuster is a mixture of at least one base and at least one acid.

In some embodiments the pH adjuster is an acid. In some embodiments the pH adjuster is a base.

In some embodiments, the pH adjuster which is used in the process is for maintaining the pH of the composition at 25° C. after dilution in water at less than 5.5.

In some embodiments, the pH adjuster which is used in the process is for maintaining the pH of the composition at 25° C. after dilution in water between about 3.5-5.1.

In some embodiments, the water content in the composition prepared by the described process is between 0.2%-0.5% by weight based on the total weight of the composition.

Buffers refer to combinations of acids and bases. Acids include but are not limited to organic and inorganic acids. Bases include but are not limited to organic and inorganic bases.

Organic acids may include but are not limited to citric acid, formic acid, acetic acid, propionic acid, butyric acid, oxalic acid, lactic acid, malic acid, and benzoic acid.

Inorganic acids may include but are not limited to hydrochloric acid, nitric acid, phosphoric acid, sulfuric acid and boric acid.

Organic bases may include but are not limited to primary and secondary amines, pyridines, imidazole and benzimidazole.

Inorganic bases may include but are not limited to sodium bicarbonate and disodium mono hydrogen phosphate.

In some embodiments, the pH adjuster is a combination of citric acid and di sodium mono hydrogen phosphate.

In some embodiments, the multilayer coating of emamectin and cartap effects the degradation of the active ingredients. Multilayer coating has consistently shown reduced degradation for Emamectin for different pH and water content as compared to coating the premix of actives together.

It was found that a composition which is prepared using premix process, the pH should be in a range of 3.5 to 4.1 and the water content between 0.2%-0.5% based on the total weight of the stable composition.

It was found that a composition which is prepared using multilayer process, the range of the pH should be in a range of 3.5 to 5.1 and the water content between 0.2%-0.5% based on the total weight of the stable composition.

It was found that a composition which is prepared using premix process, the pH should be in a range of 3.5 to 4.1 and the water content is less or equal to 0.2% based on the total weight of the stable composition.

It was found that a composition which is prepared using multilayer process, the range of the pH should be in a range of 3.5 to 5.1 and the water content is less or equal to 0.2% based on the total weight of the stable composition.

In some embodiments, the active ingredients are blended separately prior to the coating process.

In some embodiments, the powder is granulated to obtain granules.

In some embodiments, the blend is milled to the required particle size of about 1-20 µm.

In some embodiments, the blend is milled to the required particle size less than 15 µm.

For the foregoing embodiments, each embodiment disclosed herein is contemplated as being applicable to each of the other disclosed embodiments. In addition, the elements recited in composition embodiments can be used in the method and use embodiments described herein.

In some embodiment the process further comprises adding nutrients and/or fertilizer.

Nutrients may be but are not limited to Zinc, Iron, Boron, Copper, Manganese and Molybdenum Nutrients can be a free, salt, chelated derivative with chelating agent or combination thereof.

Chelating agents may be but are not limited to ethylenediaminetetraacetic acid (EDTA), diethylenetriaminepentaacetic acid (DTPA), N-(hydroxyethyl)-ethylenediaminetriacetic acid) (HEDTA) and ethylenediamine-N,N'-bis(2-hydroxyphenylacetic acid)(EDDHA).

In some embodiments, the carrier is an inert solid. In some embodiments, the inert solids include but are not limited to sand, gypsum, bentonite, china clay and lactose.

In some embodiments, the binders may include, but are not limited to starch, dextrin, gums, lignosulfonate, polymers and oils.

Examples of polymers are polyvinyl alcohol, polyvinyl pyrrolidone and polyethylene glycol.

In some embodiments, the binder is a copolymer of poly vinyl pyrrolidone and vinyl acetate.

In some embodiments, the polyvinyl pyrrolidone is a copolymer of poly vinyl pyrrolidone and vinyl acetate.

In some embodiments, the binder is Agrimer™ VA6.

Oils refer to natural and synthetic oils. Synthetic oils include but are not limited to machine oils, vegetable oil, coal tars. Natural oils include but are not limited to vegetable oil.

In some embodiments, the agriculturally acceptable inert additives refer but are not limited to anti-oxidation agents, de-foaming agents, dye, Pigment, flavoring agent, dispersing agent, synergists, encapsulates, photo-stabilizer, Binder, sticker, water soluble fertilizers, repellents and sensitizers.

Anti-oxidation agents include but are not limited to clay, BHA, BHT, TBH, Propyl gallate, Sodium thiosulphate, Tocopherol, Pyrogallol and Epichlorohydrin.

Defoaming agents include but are not limited to organo-silicones, EO/PO based defoamers, alkyl polyacrylates.

Dyes include but are not limited to acid dye, basic dye, natural dye, synthetic dye and azo dye.

In some embodiments, the process further comprises adding a wetting agent.

Wetting agents include but are not limited to nonionic and ionic derivative.

Examples of a wetter that may be used in the compositions of the subject invention include but are not limited to di alkyl naphthalene sulfonate, di alkyl sulfosuccinate, metal salt of alkyl ether sulfonate, alpha olefin sulfonate, N-acyl N-alkyl taurate, linear alkyl benzene sulfonates, carboxylates, sulphates, phosphate esters, polyoxyethylene surfactants, ethoxylated alkyl phenols, ethoxylated aliphatic alcohols, anhydrosorbitol esters and Cetyltrimethylammonium bromide.

In some embodiments, the process further comprises adding least one surfactant. Surfactants may include but are not limited to alcohol polyglycol ether, alkyl-end-capped ethoxylate glycol, alkyl-end-capped alkyl block alkoxylate glycol, dialkyl sulfosuccinate, phosphated esters, alkyl sulfonates, alkyl aryl sulfonates, tristyrylphenol alkoxylates, natural or synthetic fatty acid alkoxylates, natural or synthetic fatty alcohols alkoxylates, alkoxylated alcohols (such as n-butyl alcohol poly glycol ether), block copolymers (such as ethylene oxide-propylene oxide block copolymers and ethylene oxide-butylene oxide block copolymers) or combinations thereof.

In some embodiments, the surfactant is an alkyl-end-capped alkoxylate. In some embodiments, the adjuvant is a methyl-end-capped ethoxylate. In some embodiments, the adjuvant is a methyl-end-capped tridecyl ethoxylate. In some embodiments, the adjuvant is a methyl-end-capped tridecyl ethoxylate with six ethylene oxides.

In some embodiment the surfactant is di isopropyl naphthalene sulfonate.

In some embodiments, the process further comprises adding an adjuvant.

In some embodiments, the adjuvant is selected from a group consisting of alkyl ethoxylate glycol, alkyl block alkoxylate glycol, alkyl-end-capped ethoxylate glycol, alkyl-end-capped alkyl block alkoxylate glycol, dialkyl sulfosuccinate, ethoxylated alcohols, phosphated esters, ethoxylated tristyryl phenol phosphate, sorbitan esters, Tween™ esters and combinations thereof.

Other examples of adjuvants that may be used in the compositions of the subject invention include but are not limited to sticking agents, spreading agents, synergists, penetrants, compatibility agents and drift retardants.

Other ingredients, such as adhesives, neutralizers, binders, sequestrates, biocides, stabilizers, buffers preservatives or anti-freeze agents, may also be added to the present compositions in order to increase the stability, density, and viscosity of the described compositions.

This invention will be better understood by reference to the Experimental Section which follows, but those skilled in the art will readily appreciate that the specific experiments detailed are only illustrative of the invention as described more fully in the claims which follow thereafter.

Experimental Section

Combining emamectin and cartap into one formulation is particularly challenging because emamectin and cartap are highly sensitive and rapidly decompose. In particular, emamectin is stable to hydrolysis at pH 5, 6, 7 and 8 (25° C.) and decomposes rapidly in a neutral and/or acidic environment. Cartap, on the other hand, is stable in acidic conditions.

Example 1

TABLE 1

| Granules of Cartap Hydrochloride + Emamectin benzoate + Zn-EDTA | |
|---|---|
| Ingredient | % w/w |
| Cartap purity 94% base 7.88 | 8.38 |
| Emamectin Benzoate purity 97% base 0.26 | 0.27 |
| Zn EDTA purity 95% base 1.03 | 1.08 |
| China Clay | 2.3 |
| Citric Acid | 0.88 |
| Di sodium mono hydrogen phosphate | 0.36 |
| Dye (Pigment blue 15) | 0.1 |
| Supragil WP | 0.1 |
| Agrimer VA 6 (Net as 10% Solution) | 0.6 |
| Sand | QS to 100 |

Example 2

TABLE 2

Granules of Cartap Hydrochloride +
Emamectin benzoate + Zn-EDTA

| Ingredient | % w/w |
|---|---|
| Cartap purity 94% base 7.88 | 8.38 |
| Emamectin Benzoate purity 97% base 0.26 | 0.27 |
| Zn EDTA purity 95% base 1.03 | 1.08 |
| China Clay | 2.3 |
| Citric Acid | 1.20 |
| Di sodium monohydrogen phosphate | 0.36 |
| Dye (Pigment blue 15) | 0.1 |
| Supragil WP | 0.1 |
| Agrimer VA 6 (Net as 15% Solution) | 0.6 |
| Sand | QS to 100 |

Manufacturing Process 1:
Part A:

Emamectin benzoate, Zn EDTA, china clay, citric acid, disodium mono hydrogen phosphate, dye and Supragil WP were mixed in a pre-blender and then milled using a jet mill (d90<30 micron). The mixture was then post-blended with cartap to achieve a homogeneous powder.

Part B:

90 parts of water was placed in a vessel equipped with a stirrer and the required quantity of Agrimer VA 6 was added under stirring. The stirring continued until a clear solution was obtained. The required quantity of sand was weighed into a coating pan/granulator, the spray portion of Part B followed by the addition of a portion of part A were then added to the granulator. The water was evaporated in order to form free flowing granules. The sequence of addition was repeated until all of part A and part B were coated.

Manufacturing Multilayer Process (2)
Preparation of Part A
1) Emamectin benzoate, Zn-EDTA, China clay, 30% of pigment, di sodium mono hydrogen phosphate and Di isopropyl naphthalene sulfonate were mixed in a pre-blender.
2) The pre-mix was milled using an appropriate mill to a particle size of d90<15 microns.
3) The milled mixture was post-blended to get a homogeneous powder.

Preparation of Part B
1) The required quantity of cartap Hydrochloride, citric acid and remaining 70% of the pigment were mixed in a blender.

Preparation of Part C
1) Soft water was charged into a vessel equipped with a stirrer and the required quantity of copolymer of vinyl acetate and polyvinyl pyrrolidone was added while stirring, thereby making a 15% w/w solution. The stirring was continued until a clear solution was obtained.

Preparation of Granule Composition
1) The required quantity of sand was weighed in granulator.
2) One third portion of Part C was sprayed followed by the addition of part A. This was then mixed well.
3) Another one third portion of part C was sprayed followed by the addition of half of part B. This was then mixed well.
4) The remaining one third portion of part C was sprayed followed by the addition of the remaining half of part B. This was then mixed well.
5) Water was evaporated to a level<0.2% w/w using an appropriate dryer.
6) The granules were sieved through a 12/36 BSS sieve.
7) The product was packed in an appropriate package.

Optionally, Part A and Part B may be blended together before granulation and one third of it can be charged at a time with one third of part C spraying. The process can be repeated three times to complete the batch. Premix of part A and B is not storage stable and therefore, should be used immediately.

Manufacturing Multilayer Process (3)
Preparation of Part A

Emamectin benzoate, Zn-EDTA, China clay, 30% of pigment, di sodium mono hydrogen phosphate and Di isopropyl naphthalene sulfonate were mixed in a pre-blender.

The pre-mix was milled using an appropriate mill to a particle size of d90<100 microns preferably <20 microns.

The milled mixture was post-blended to get a homogeneous powder.

Preparation of Part B

The required quantity of cartap Hydrochloride, citric acid and remaining 70% of the pigment were mixed in a blender. The pre-mix was milled using an appropriate mill to a particle size of d90<100 microns preferably <20 microns.

Preparation of Part C

Soft water was charged into a vessel equipped with a stirrer and the required quantity of copolymer of vinyl acetate and polyvinyl pyrrolidone was added while stirring, thereby making a 15% w/w solution. The stirring was continued until a clear solution was obtained.

Preparation of Granule Composition
1) The required quantity of sand was weighed in granulator.
2) Half portion of Part C was sprayed followed by the addition of part B. This was then mixed well.
3) Another one fourth portion of part C was sprayed followed by the addition of part A. This was then mixed well.
4) The remaining one fourth portion of part C was sprayed. This was then mixed well.
5) Water was evaporated to a level<0.3% w/w using an appropriate dryer.
6) The granules were sieved through a 12/36 BSS sieve.
7) The product was packed in an appropriate package.

Premix of part A and B is not storage stable and therefore, should be used immediately.

Stability Results:

In the experiments, the pH values were maintained within the range of 3.6-4.0 (pH, recorded as 1% Aq. suspension)

In addition, two different levels of water content were measured, content (a) less than 0.2% and b) from more than 0.3% to less than 0.5%.

In example 1, the concentrations of the cartap and emamectin were measured after 14 days storage at 54° C.

The degradation of emamectin is 0.95% and 2.3% when the compositions were prepared by processes 1 and 2, respectively.

The degradation of cartap is not available and 0.23% when the compositions were prepared by processes 1 and 2, respectively.

In example 2, the degradation values are disclosed in table 3.

TABLE 3

| Ingredient | Composition 1 | Composition 2 |
|---|---|---|
| Cartap 7.50% w/w @5% extra purity 94% | 83.77 | 83.77 |
| citric acid monohydrate | 12 | 12 |
| Pigment blue 15.0 | 1 | 1 |
| Emamectin benzoate 0.25% w/w, @5% extra purity 95% | 2.8 | 2.8 |
| Na2HPO4 | 3.58 | 3.58 |
| China clay | 23 | 23 |
| Supragil WP | 1 | 1 |
| Zn EDTA | 10.1 | 10.1 |
| VA-6 content as 15% solution | 6 | 6 |
| Sand | 856.75 | 856.75 |
| TOTAL | 1000 | 1000 |
| Moisture content | 0.26 | 0.10 |
| pH (1% Aq.) | 3.73 | 3.69 |
| % w/w Cartap hydrochloride (0 day) | 7.92 | 7.72 |
| % w/w Cartap hydrochloride (14 day, 54° C.) | 8.44 | 7.85 |
| % degradation of Cartap Hydrochloride (14 day, 54° C.) | 0 | 0 |
| % w/w Emamectin benzoate (0 day) | 0.269 | 0.274 |
| % w/w Emamectin benzoate (14 day, 54° C.) | 0.275 | 0.270 |
| % degradation of Emamectin benzoate (14 day, 54° C.) | 0 | 1.46 |

Experiments with Different pH Values and Water Contents:

Attempts to combine an emamectin and cartap into a single composition failed numerous times.

TABLE 4 describes 4% GR failed compositions of emamectin with cartap;

| Ingredient | Composition 1 | Composition 2 |
|---|---|---|
| Cartap 7.50% w/w @5% extra purity 94% | 83.77 | 83.77 |
| citric acid monohydrate | 0 | 12 |
| Pigment blue 15.0 | 1 | 1 |
| Emamactin benzoate 0.25% w/w, @5% extra purity 95% | 2.8 | 2.8 |
| Na2HPO4 | 3.58 | 3.58 |
| China clay | 23 | 23 |
| Supragil WP | 1 | 1 |
| Zn EDTA | 10.1 | 10.1 |
| VA-6 content as 15% solution | 6 | 6 |
| Sand | 868.75 | 856.75 |
| TOTAL | 1000 | 1000 |
| Moisture content | 0.13 | 0.62 |
| pH (1% Aq.) | 5.83 | 4.05 |
| % w/w Cartap hydrochloride (0 day) | 8.05 | 8.05 |
| % w/w Cartap hydrochloride (14 day, 54° C.) | 7.79 | 7.81 |
| % degradation of Cartap Hydrochloride (14 day, 54° C.) | 3.17 | 2.98 |
| % w/w Emamectin benzoate (0 day) | 0.24 | 0.26 |
| % w/w Emamectin benzoate (14 day, 54° C.) | 0.2 | 0.22 |
| % degradation of Emamectin benzoate (14 day, 54° C.) | 16.7 | 18.85 |

| Degradation values of active ingredients in different conditions | | | | | |
|---|---|---|---|---|---|
| pH (1% Aq.) | water content (% w/w) | % Emamectin degradation (14 Days Storage, 54° C.) | | % Cartap Hydrochloride degradation (14 days storage, 54° C.) | |
| | | Process 1 | Process 2 | Process 1 | Process 2 |
| 5.8 | >0.3 to <0.5 | 70.74 | 26.59 | 4.94 | 6.48 |
| 5.8 | <0.2 | 16.7 | 20.2 | 3.16 | 1.09 |
| 5.5 | >0.3 to <0.5 | 40.96 | 24.63 | 3.30 | NA |
| 5.5 | <0.2 | 8.33 | 6.89 | 0.00 | NA |
| 5.1 | >0.3 to <0.5 | 12.12 | 27.2 | 4.05 | 1.22 |
| 5.1 | <0.2 | 7.98 | 4.49 | 2.40 | 1.67 |
| 4.7 | >0.3 to <0.5 | 17.1 | 7.31 | 3.63 | NA |
| 4.7 | <0.2 | 6.14 | 2.38 | 2.46 | NA |
| 4.1 | >0.3 to <0.5 | 14.45 | 5.02 | NA | 2.80 |
| 4.1 | <0.2 | 0.95 | 2.3 | NA | 0.23 |
| 3.5 | >0.3 to <0.5 | 13 | 13.97 | 0 | 2.80 |
| 3.5 | <0.2 | 1.9 | 4.49 | 0 | 2.27 |

Pouch Bulging Under Accelerated Storage:

Pouch bulging is an additional test which reflects the stability of the composition. Bulging is caused by releasing of gas during degradation of at least one of the active ingredients.

Pouch bulging was recorded as a visual observation. It was found that, when there is more bulging, the composition is less chemically stable. Carbonyl sulphide has been identified as the major gas in degradation product of Cartap+Emamectin GR composition.

In general, compositions with a high level of degradation of emamectin were found to have a large change in the pH as well as pouch bulging. Treatments with a lower water content at a given pH value have always shown less change in pH value and less pouch bulging.

For GR composition, it was observed that the failed batches are associated with the bulging of the pouch under accelerated storage. For study of accelerated storage at 54° C. for 14 days, the sample is kept in a sealed tri-laminated aluminum pouch and after storage, the visual observations are done to observe the pouch bulging, if any. Comparative rating was done, where more number of stars denotes more bulging. From table 5, it is clear that, for the storage stability samples of pH 5.1, 4.7, 4.1 and 3.5 (for both the processes) samples with water content of less or equal to 0.2% water content by weight based on the total weight of the stable composition, have not shown any bulging.

Table 7, Describe Pouch Bulging and pH Value Change Under Accelerated Storage.

TABLE 7

| Sr. No. | Product pH | Product moisture | pH value changes (0 day minus storage sample) under accelerated storage | | Pouch bulging under accelerated storage | |
|---|---|---|---|---|---|---|
| | | | Process 1 | Process 2 | Process 1 | Process 2 |
| 1 | 5.8 | 0.34 | 0.39 | −0.36 | **** | ** |
| 2 | | 0.13 | 0.27 | −0.24 | * | * |
| 3 | 5.5 | 0.36 | 0.05 | −0.63 | *** | ***** |
| 4 | | 0.12 | 0.18 | −0.03 | * | * |
| 5 | 5.1 | 0.42 | −0.97 | −0.77 | **** | **** |
| 6 | | 0.17 | −0.43 | −0.39 | NIL | NIL |
| 7 | 4.7 | 0.39 | −0.45 | −1.05 | *** | *** |
| 8 | | 0.15 | −0.18 | −0.31 | NIL | NIL |
| 9 | 4.1 | 0.40 | −1.11 | −1.28 | *** | **** |
| 10 | | 0.14 | −0.17 | −0.25 | NIL | NIL |
| 11 | 3.5 | 0.38 | −1.33 | −1.14 | **** | *** |
| 12 | | 0.13 | −0.2 | −0.39 | NIL | NIL |

NIL (not observed); Asterisk, refers to level of bulging low level (1) to high (5).

As concluded, emamectin and cartap were chemically stable in a composition having a reduced amount of water, less than 0.2% by weight based on the total weight of the composition and the pH is between 3.5 to 5.1.

In addition, any priority document(s) of this application is/are hereby incorporated herein by reference in its/their entirety.

What is claimed:

1. A stable solid insecticidal composition comprising:
   (a) emamectin benzoate in an amount of 0.1-4% by weight based on the total weight of the stable composition;
   (b) cartap in an amount of 7-10% by weight based on the total weight of the stable composition; and
   (c) at least one pH adjuster for reducing the change in the pH of the stable solid insecticidal composition so that the pH is maintained between 3.5 and 5.1±10% during storage, the pH being measured and recorded as a 1% w/w composition in water, the at least one pH adjuster selected from the group of buffers, bases, acidifiers, and mixtures of a base and an acid;
   wherein the water content of the stable composition is maintained at between 0% and less than 0.5% by weight; based on the total weight of the composition, wherein the pH of the composition is measured in a sample after wetting or diluting a sample of the composition with water at 25° C.

2. The stable solid insecticidal composition of claim 1, wherein the water content is maintained by packing said composition in a package impermeable to moisture such that the water content in the composition contained in the package is not changed during storage, from a water content of between 0% and less than 0.5% by weight based on the total weight of the stable composition and the pH at 25° C. after dilution in water is maintained at 3.5-5.1±10%, wherein the pH of the composition is measured in a sample after wetting or diluting a sample of the composition with water at 25° C.

3. The composition of claim 1, wherein the amount of the emamectin benzoate is 0.25%±10% by weight based on the total weight of the stable composition.

4. The composition of claim 1, wherein the amount of the cartap is 7.5%±10% by weight based on the total weight of the stable composition.

5. The stable solid insecticidal composition of claim 1, comprising:
   (a) emamectin benzoate in an amount of 0.25%±10% by weight based on the total weight of the stable composition; and
   (b) cartap in an amount of 7.5%±10% by weight based on the total weight of the stable composition; and
   wherein the water content is maintained to between 0% and less than 0.5% by weight based on the total weight of the stable composition during storage.

6. The composition of claim 1, wherein the water content is maintained to between 0.2-0.5% by weight based on the total weight of the stable composition during storage.

7. The composition of claim 1, wherein the water content is maintained to between 0% and 0.2% by weight based on the total weight of the stable composition during storage.

8. The composition of claim 1, wherein the pH adjuster for reducing the change in the pH during storage is a combination of citric acid and disodium mono hydrogen phosphate.

9. The composition of claim 1, wherein the composition further comprises a surfactant, a wetting agent, an anti-oxidation agent, or any combination thereof.

10. The composition of claim 1, wherein the composition further comprises an agriculturally acceptable binder, an inert solid agriculturally acceptable carrier, or both.

11. The composition of claim 10, wherein the binder is solid or liquid.

12. The composition of claim 10, wherein the binder is selected from a group comprising starch, dextrin, gums, lignosulfonate, polymers and oils.

13. The composition of claim 10, wherein the binder is a copolymer of poly vinyl pyrrolidone and vinyl acetate.

14. The composition of claim 10, wherein the carrier is sand.

15. The composition of claim 1, further comprising a nutrient.

16. The composition of claim 15, wherein the nutrient is zinc EDTA.

17. A method for controlling insects comprising applying the stable solid insecticidal composition of claim 1 to a rice field or to an area or soil adjacent to an insect.

18. A method for controlling insects comprising:
(a) obtaining a stable solid insecticidal composition of claim 1;
(b) applying the stable insecticide composition to a crop, a portion of a crop, an area or soil adjacent to an insect, a seed of a crop or any combination thereof, so as to thereby control the insect.

19. A process for preparing the stable solid insecticidal composition according to claim 1, the process comprising the steps of:
(a) preparing a premix of the emamectin benzoate, cartap, at least one pH adjuster and other agrochemically acceptable inert additives;
(b) milling the mixture to obtain powder;
(c) activating a carrier with a binder;
(d) coating the activated carrier of step (c) with the powder of (b) or spraying the powder (b) over the activated carrier of step (c); and
(e) drying the resulting mixture of step (d).

20. A process for preparing the stable solid insecticidal composition according to claim 1, wherein the process comprises the steps of:
(a) preparing a premix of the emamectin benzoate, cartap, at least one pH adjuster and other agrochemically acceptable inert additives;
(b) activating a carrier with a binder;
(c) coating the activated carrier of step (b) with the premix (a) or spraying the premix (a) over the activated carrier of step (b); and
(d) drying the resulting mixture of step (c).

21. A process for preparing the stable solid insecticidal composition according to claim 1, wherein the process comprises the steps of:
(a) preparing a powder blend of emamectin benzoate, a pH adjuster and other agrochemically acceptable inert additives;
(b) preparing a powder blend of cartap, a pH adjuster and other agrochemically acceptable inert additives;
(c) preparing a solution comprising a binder;
(d) multilayer coating an inert carrier with (a) and (b) using solution (c); and
(e) drying the resulting mixture of step (d).

22. A method for controlling the degradation of emamectin benzoate and cartap in a solid insecticidal composition, and thus increasing the chemical stability of the composition, the method comprising formulating a composition comprising emamectin benzoate, cartap, and an amount of water of between 0% and less than 0.5% by weight based on the total weight of the composition and at least one pH adjuster for reducing the change in the pH of the composition encountered during storage so that the pH is maintained between 3.5-5.1±10% during storage, the pH being measured and recorded as a 1% w/w composition in water, wherein the at least one pH adjuster is selected from the group of buffers, bases, acidifiers, and mixtures of at least one base and at least one acid, wherein the composition comprises emamectin benzoate in an amount of 0.1-4% by weight based on the total weight of the composition; and cartap in an amount of 7-10% by weight based on the total weight of the composition, and maintaining the water content of the composition during storage to between 0% and less than 0.5% by weight during storage i. based on the total weight of the composition, wherein the pH of the composition is measured in a sample after wetting or diluting a sample of the composition with water at 25° C.

23. The method of claim 22 wherein the water content of the solid insecticidal composition is maintained by packing the solid insecticidal composition in a package impermeable to moisture such that the water content in the solid composition contained in the package is not changed during storage from a water content of between 0% and less than 0.5% by weight, based on the total weight of the composition.

24. The method of claim 22, wherein the water content of the solid insecticidal composition is maintained to between 0.2-0.5% by weight based on the total weight of the stable composition.

25. The method of claim 22, wherein the composition is formulated to comprise emamectin benzoate in an amount of 0.1-4% by weight based on the total weight of the composition; and cartap in an amount of 7-10% by weight based on the total weight of the composition, wherein the method comprises a further step of packing the solid insecticidal composition in a package impermeable to moisture such that the water content in the solid composition contained in the package is not changed during storage from a water content of between 0% and less than 0.5% by weight, based on the total weight of the composition.

26. The method of claim 25, wherein the water content of the solid insecticidal composition contained in the package is maintained to between 0.2-0.5% by weight based on the total weight of the composition during storage.

27. The method of claim 25, wherein the pH adjuster for reducing the change in the pH of the composition encountered during storage is a combination of citric acid and disodium mono hydrogen phosphate and wherein the water content of the packed composition is maintained to between 0% and 0.2% by weight based on the total weight of the stable composition during storage.

28. The composition formulated in the method of claim 22, wherein the pH adjuster for reducing the change in the pH of the composition encountered during storage is a combination of citric acid and disodium mono hydrogen phosphate.

29. A packaged stable solid insecticidal composition comprising:
(a) emamectin benzoate in an amount of 0.1-4%±10% by weight based on the total weight of the packaged composition; and
(b) cartap in an amount of 7-10%±10% by weight based on the total weight of the packaged composition;
(c) at least one pH adjuster for maintaining the pH of the composition at 3.5-5.1±10%, when measured after wetting a sample of the composition or dilution with water,
wherein the pH adjuster is selected from the group of buffers; bases; acidifiers; and mixtures of at least one base and at least one acid wherein the water content of the packaged stable composition is between 0% and less than 0.2% by weight based on the total weight of the composition, and wherein the package is impermeable to moisture such that the water content of the composition contained in the package is not changed when the package is exposed to humid air, wherein the package is a sealed pouch, the composition being characterized by,
i) less bulging after storage at 54° C. for 14 days,
ii) less liberation of carbonyl sulphide gas after storage at 54° C. for 14 days, or iii) less change in pH of the composition after storage at 54° C. for 14 days when measured after dilution of a sample of the composition with water, each being as compared to similarly packaged compositions comprising emamectin benzoate and cartap having a water content between 0.2% and less than 0.5% by weight.

30. The packaged stable solid insecticidal composition of claim 29 wherein the composition comprises any, some, or all of, a granular composition, powder composition, dispersible granules composition, or dispersible powder composition.

31. A method for,
    a) reducing the bulging of a sealed package comprising a solid composition of emamectin benzoate and cartap after storage at 54° C. for 14 days,
    b) reducing the liberation of carbonyl sulphide gas from a solid composition of emamectin benzoate and cartap after storage at 54° C. for 14 days, or
    c) reducing the change in pH of a solid composition of emamectin benzoate and cartap after storage at 54° C. for 14 days, wherein the method comprises formulating the solid composition so as to have a water content of between 0% and 0.2% by weight based on the total weight of the composition and then packaging in a package impermeable to moisture, such that the water content of the composition contained in the package is not changed when the package is exposed to humid air, such that said reduction in bulging, said reduction in the liberation of carbonyl sulphide gas, or said reduction in the change in pH being as compared to a comparable solid composition of emamectin benzoate and cartap with a water content of greater than 0.2%, or as compared to a comparable solid composition of emamectin benzoate and cartap packaged in a package that is not impermeable to moisture.

* * * * *